(12) United States Patent
McPolin

(10) Patent No.: US 7,219,206 B1
(45) Date of Patent: May 15, 2007

(54) FILE SYSTEM VIRTUAL MEMORY DESCRIPTOR GENERATION INTERFACE SYSTEM AND METHOD

(75) Inventor: Steve McPolin, Nepean (CA)

(73) Assignee: Sun Microsystems, Inc., Santa Clara, CA (US)

( * ) Notice: Subject to any disclaimer, the term of this patent is extended or adjusted under 35 U.S.C. 154(b) by 746 days.

(21) Appl. No.: 10/412,147

(22) Filed: Apr. 11, 2003

(51) Int. Cl.
*G06F 12/00* (2006.01)
(52) U.S. Cl. .................. 711/170; 707/200; 707/205; 707/3
(58) Field of Classification Search ............... 711/170, 711/203; 707/200, 205, 4, 3
See application file for complete search history.

(56) References Cited

U.S. PATENT DOCUMENTS

| 6,065,037 | A * | 5/2000 | Hitz et al. .................. 709/200 |
| 2003/0115218 | A1 * | 6/2003 | Bobbitt et al. .............. 707/200 |
| 2004/0091114 | A1 * | 5/2004 | Carter et al. ................ 380/259 |
| 2004/0133570 | A1 * | 7/2004 | Soltis ........................... 707/3 |

OTHER PUBLICATIONS

Welch, The File System Belongs in the Kernel, Proceedings of the 2.sup.nd Usenix Mach Symposium, Nov. 20-22, 199 pp. 233-250.*

S. Kleiman, "Vnodes: An Architecture for Multiple File Types in Sun UNIX," Proceedings of the Summer USENIX Conference, Jun. 1986, pp. 238-247, USENIX Association, Berkeley, CA USA.*

M. Satyanarayanan, "Scalable, Secure, and Highly Avaliable Distributed File Access," IEEE Computer, May 1990, pp. 9-20, Institite of Electrical and Electronics Engineers, Inc., Piscataway, NJ USA.*

* cited by examiner

*Primary Examiner*—Pierre-Michel Bataille
(74) *Attorney, Agent, or Firm*—Martine Penilla & Gencarella, LLP

(57) ABSTRACT

A computer system having a kernel interface that provides a technique for creating memory descriptors that provides a single way of representing memory objects and provides a common interface to operations upon those objects. The present invention allow programmers to create a kernel interface that provides a mechanism to achieve a cohesive de-coupled interface between file-systems and virtual memory in a distributed computer system. The present invention allows the kernel interface to be provided as four sub-components with a primary abstraction mechanism and three supporting mechanisms. The primary abstraction is a memory descriptor that presents a common interface to manifold memory objects. The set of supported objects is complete in that the file-system need not deal with any other representation of memory.

37 Claims, 7 Drawing Sheets

FILE SYSTEM VIRTUAL MEMORY DESCRIPTOR GENERATION INTERFACE SYSTEM AND METHOD

CROSS REFERENCE TO RELATED APPLICATION

This application is related to Steve McPolin et al., co-filed U.S. patent application Ser. No. 10/412,147, filed on Apr. 11, 2003, titled "SYSTEM AND METHOD OF FILESYSTEM INTERVAL LOCKS". To the extent not repeated herein, the contents of this patent application are hereby incorporated herein by reference.

FIELD OF THE INVENTION

The present claimed invention relates generally to the field of computer operating systems. More particularly, embodiments of the present claimed invention relate to a system for providing an operating system kernel interface for memory descriptors in a virtual memory system.

BACKGROUND ART

A computer system can be generally divided into four components: the hardware, the operating system, the application programs and the users. The hardware (central processing unit (CPU), memory and input/output (I/O) devices) provides the basic computing resources. The application programs (database systems, games business programs (database systems, etc.) define the ways in which these resources are used to solve the computing problems of the users. The operating system controls and coordinates the use of the hardware among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a simple time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

Unix consists of two separable parts: the "kernel" and the "system programs." Systems programs consist of system libraries, compilers, interpreters, shells and other such programs which provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are the means for the programmer to communicate with the kernel.

FIG. 1 is a block diagram illustration of a prior art computer system 100 having a processor 110, file-system 120, memory 130, operating system 140, kernel 150, applications 160 and I/O devices 170. The prior art system 100 shown in FIG. 1 employs a distributed memory mapping scheme in which physical memory and I/O of the system 100 is mapped with hardware descriptors.

The prior art system 100 implements a shared resource environment which allows such system resources as memory 130 and file-system 120 to be shared between applications processes in applications 160. The kernel 150 includes interfaces that allows applications processes to access virtual memory in memory 130. In the system 100 shown in FIG. 1, the kernel interface has limitations in its capabilities in supporting multiple and varied applications that access the file-system 120 despite the shared environment of system 100. This is because new file-system technologies have limited applicability due to the difficulty in adapting others to accommodate them. For example, multiple page size support in the virtual memory system in system 100 is not supported in a UFS file-system or other file-systems. On-line backups via snapshots cannot handle the files which have locked pages.

The difficulties with current kernel interfaces is primarily due to their shared state. File-systems must implement knowledge about the virtual memory system in order to operate correctly. This knowledge is vague and dynamic with respect to a source base. The corresponding difficulty lies within the virtual memory system, in that it can only assume generic file-system behavior; file-systems typically have no way to indicate it can utilize a new behavior.

As distributed systems become prevalent, it is important that the number of system downtimes be substantially reduced. CPU and network speeds, RAM and disk sizes will increase and so will access to these devices. The interface between the file-system 120 and memory 130 implementation therefore becomes important.

Memory requirements of computer system 100 frequently cannot be met with a single memory device. Several memory devices must then be interconnected to form a memory system. In a memory system, capacity is expanded by increasing the number of words or by increasing the word length above an attainable single memory device. Word length is increased by placing the outputs of two or more memory devices in parallel. The number of words in a memory system is increased by multiplexing outputs from two or more memory devices.

A memory system with an increased number of words requires address expansion, it requires expanding the number of address bits to which the memory system responds. The number of address bits that a microprocessor provides dictates its memory address space or the range of memory locations it can directly address. Depending upon the size of the memory system, external address decoding logic, in addition to the memory's inputs may be also be required for address expansion. Random access memory (RAM) is typically the main memory in many prior art computers. As programs are run, they first load into RAM from the disk drive 170, and the operating system then jumps to the beginning of the program to begin executing it. Program data also loads into computer's RAM. As changes are made in the data, the contents of the RAM are altered, and when the user finishes with the application, the revised data is copied back to the disk drive.

Read only memory (ROM) is the part of memory where, normally the basic input/output system (BIOS) of the computer resides. The BIOS is the interface between the computer hardware and the operating system and applications software. Under normal circumstances, one cannot write to ROM.

The size of the RAM and the ROM and the locations of various components is shown with memory. The prior art computer 100 includes several memory types that access different locations in the main memory. And in order to have a cohesive memory access to the various applications that run in the computer system 100, the memory device 130 in the prior computer system 100 typically has a number of memory descriptors 214–216 that define relationships between the applications and main memory identifying specific address ranges 210–212 for specific purposes. As illustrated in FIG. 2, the prior art computer 100 has unique specific descriptors 214–216 for each instance of an application that access a different type of memory in the system 100.

Having a number of descriptors represent a single application's access to memory could lead to errors to describe regions in main memory owned by a single device. The large number of descriptors also results in the use of a large number of memory logic circuitry to design main memory which could then result in slow access to memory in the computer system. Furthermore, the prior art has memory segments with corresponding page table entries for each application access main memory. There is a many-to-one relationship between the page table entries and the memory segments for applications which results to additional memory resources unnecessarily allocated to the applications.

SUMMARY OF INVENTION

Accordingly, to take advantage of the myriad of distributed computer system and associated file systems available and the increasing number of new applications being developed for these distributed systems, a system is needed that has capabilities to allow an application to access several types of memory in a computer system without having to use a unique, access and purpose specific descriptors to access main memory. Further, a need exists for solutions to allow the development of a memory descriptor interface that may be implemented by a host application programs without requiring each iteration of the application programs to execute or generate its own independent descriptor. A need further exists for an improved and less costly program independent operating system, which improves efficiency and provide a means to compile programs without losing the embedded features designed in these programs.

What is described herein is a computer system having a kernel interface that provides a technique for creating memory descriptors that provides a single way of representing memory objects and provides a common interface to operations upon those objects. Embodiments of the present invention allow programmers to create a kernel interface that provides a mechanism to achieve a cohesive de-coupled interface between file-systems and virtual memory in a distributed computer system. Embodiments of the present invention allows the kernel interface to be provided as four sub-components with a primary abstraction mechanism and three supporting mechanisms. The primary abstraction is a memory descriptor that presents a common interface to manifold memory objects. The set of supported objects is complete in that the file-system need not deal with any other representation of memory. Memory descriptors of the present invention are allocated from a pool of descriptors. The pool lends lifelong attributes to the descriptors allocated from it. The attributes specify operational behavior of memory descriptors functions in the computer system.

Embodiments of the present invention include a generic memory information extraction logic that provides constructive functions an application program requires to create memory descriptors. The generic memory information extraction logic also provides constructors for each underlying type of memory descriptor generated.

Embodiments of the present invention also include multiple descriptor derivative logic generates derived descriptors for each generic memory descriptor generated. The derived descriptors are derived from base descriptors generated by the generic memory information extraction logic.

Embodiments of the generic memory information extraction logic of the present invention include abstraction logic that generates abstractions on several different types of memory representations in the computer system.

Embodiments of the generic memory information extraction logic further include memory block combination logic for combining contiguous memory blocks extracted with a specified range of memory for a particular file-system.

Embodiments of the generic memory information extraction logic further include memory block separation logic for providing a mechanism for separating a memory block extracted from a specified range of memory responsive to the memory descriptor into smaller blocks of memory.

Embodiments of the multiple descriptor derivative logic include mapping logic for mapping abstracted virtual memory blocks into physical memory address space corresponding to the descriptor information created.

Embodiments of the multiple descriptor logic further include constructive logic for generating identifiers which are provided to release mapping and associated locks for a particular range of memory. There is a constructor for each underlying memory descriptor type for system calls handle by the kernel to main memory. Once a memory descriptor is constructed, the descriptor may be the subject of any of the common memory descriptor functions in the distributed computer system These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method for providing a file-system virtual memory interface and memory descriptor generation system in a computer system that may be applicable to operating system kernels. In accordance with an aspect of the invention, a the memory descriptor generation system generated memory descriptor that manage a plurality of memory objects without having each of such objects independently generating a plurality of memory descriptor for each instantiation of applications that run in the computer system.

Figure 1:
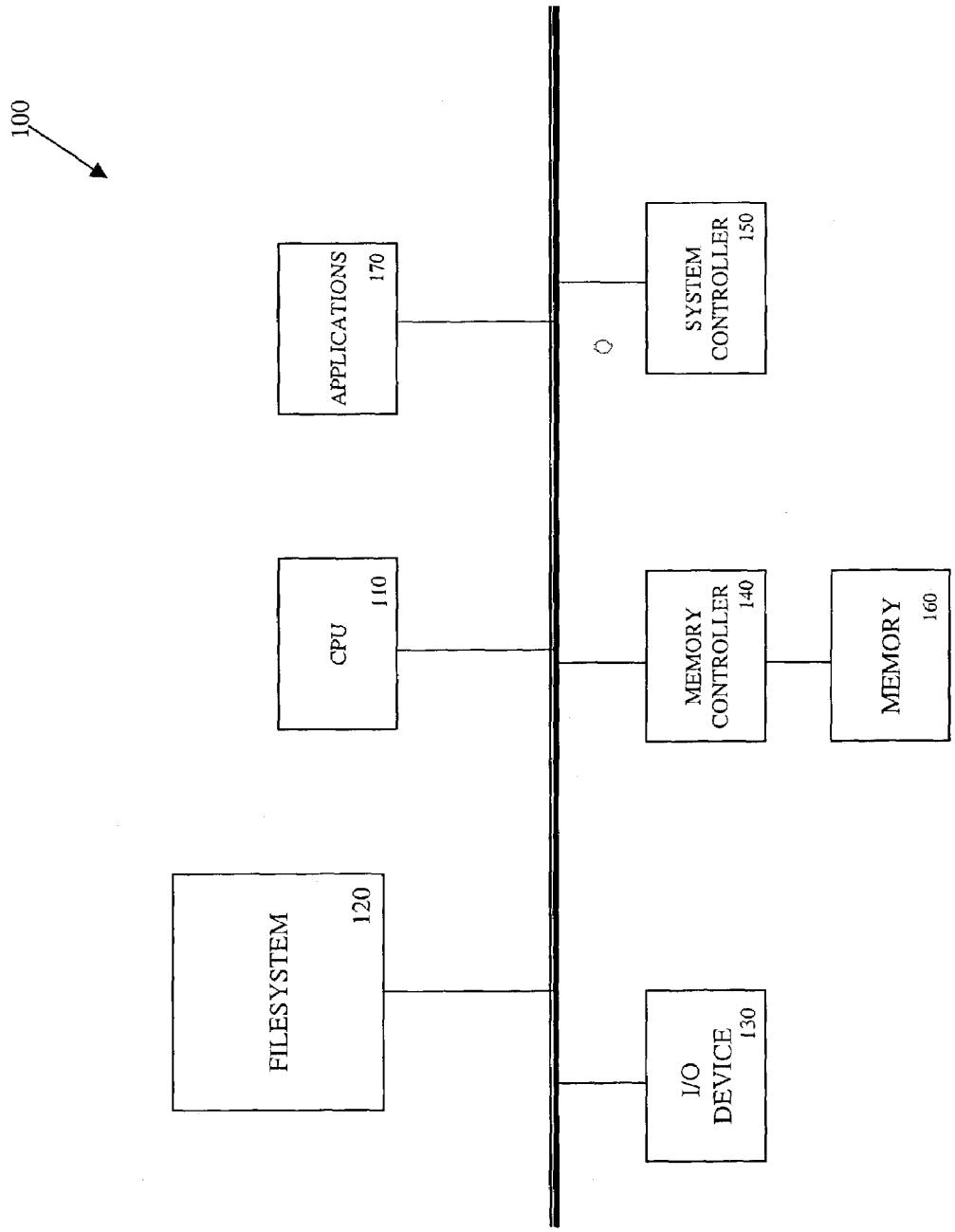
FIG. 1 is a block diagram of a prior art computer system.
Figure 2:
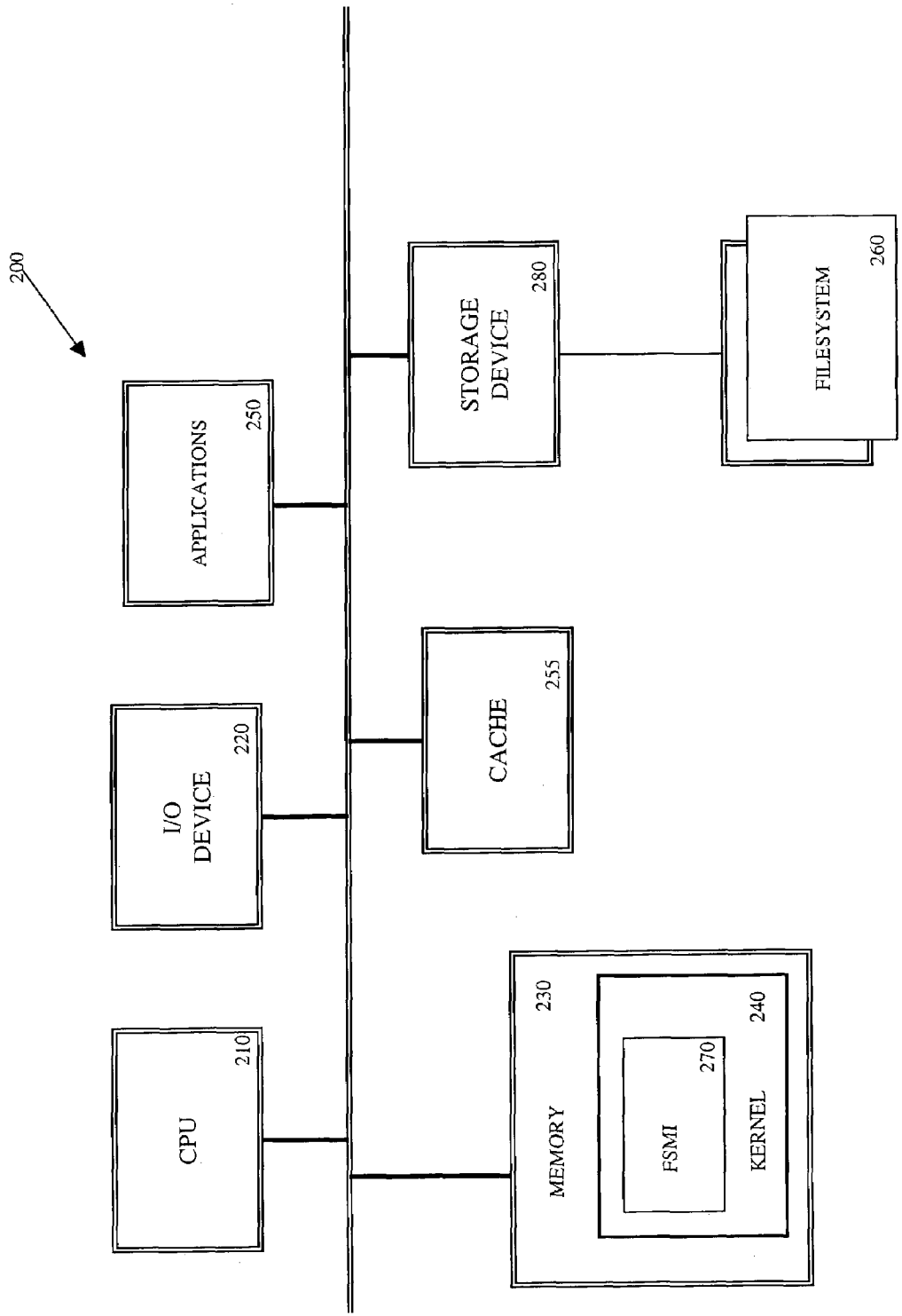
FIG. 2 is a block diagram of a prior art memory descriptor scheme of a prior art distributed computer system computer system.
Figure 3:
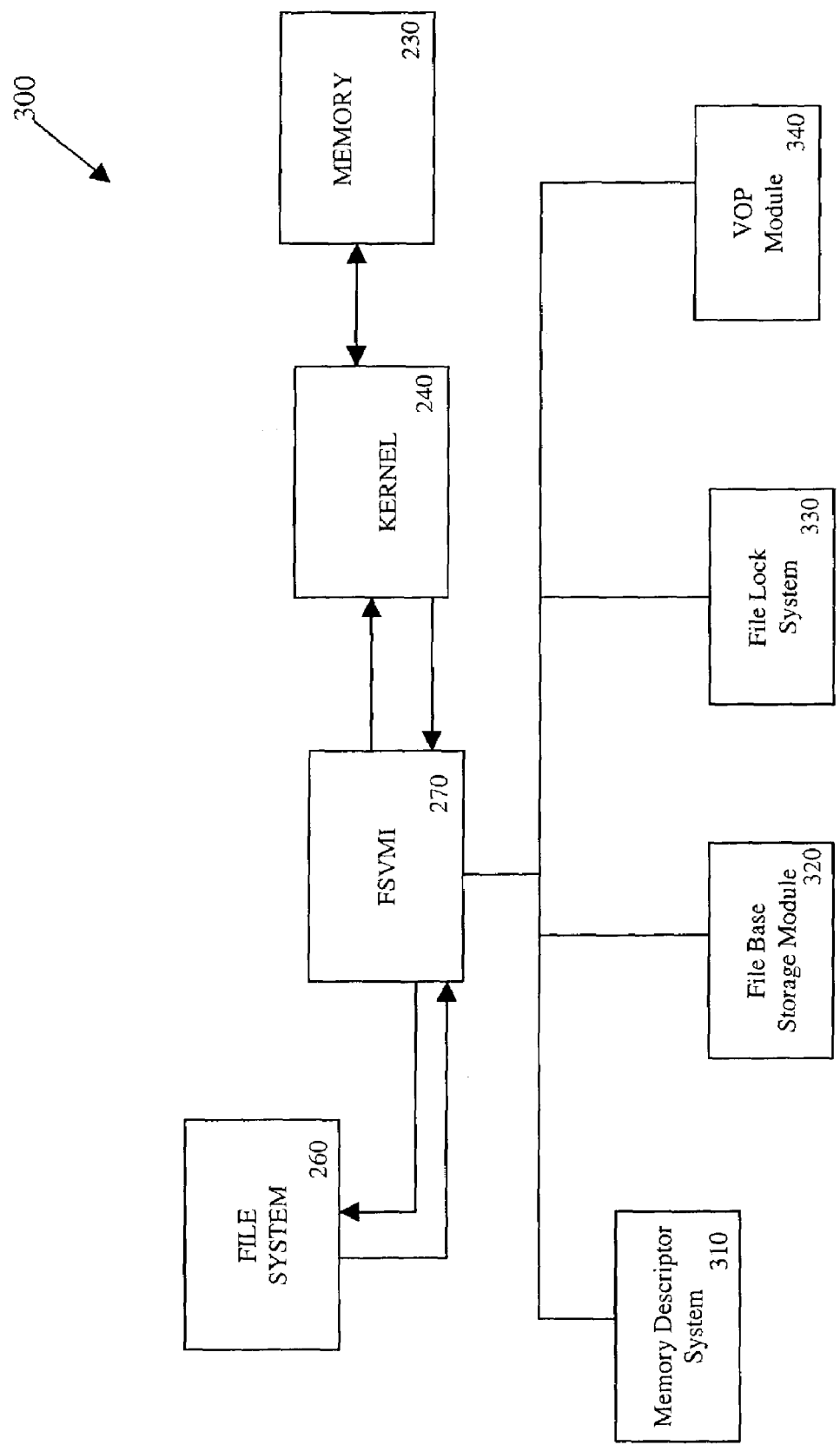
FIG. 3 is a block diagram illustration of a computer system in accordance with the present invention.

FIG. 3 is a block diagram illustration of one embodiment of a computer system 300 of the present invention. The computer system 300 according to the present invention is connected to an external storage device 380 and to an external drive device 320 through which computer programs according to the present invention can be loaded into computer system 300. External storage device 380 and external drive 320 are connected to the computer system 300 through respective bus lines. Computer system 300 further includes main memory 330, processor 310, file-system 360, application 350, cache 355 and descriptor generation system 370. Drive 320 can be a computer program product reader such a floppy disk drive, an optical scanner, a CD-ROM device, etc.

FIG. 3 additionally shows memory 330 including a kernel level memory 340. Memory 330 can be virtual memory which is mapped onto physical memory including RAM or a hard drive, for example, without limitation. During process execution, a programmer programs data structures in the memory at the kernel level memory 340. According to the present invention, the file system virtual memory descriptor generation system 370 generates memory descriptors to represent corresponding applications having a plurality of instantiations.

The memory descriptor generated provides a single mechanism of representing memory objects and provides a common interface to operations upon those objects. In one embodiment of the present invention, two types of memory descriptors may be generated: a basic descriptor that manages memory objects and derived descriptors that manage other memory descriptors. In one embodiment of the present invention, only one level of derivation is supported and subsequent derivations are constructed relative to the underlying basic descriptor.

Each memory object in memory 330 has two primary components: the underlying memory itself and its mapping structures. The memory descriptor grants access to the underlying memory by providing a pointer to some sub-range of the object. In one embodiment of the present invention, the memory descriptor has a collection of attributes which guide it's behavior: these attributes are associated with a pool from which the memory descriptor is allocated. In one embodiment of the present invention each memory descriptor logically comprises type information, data, an offset, length information, a reference information and the pool from which the descriptor is allocated.

Figure 4:
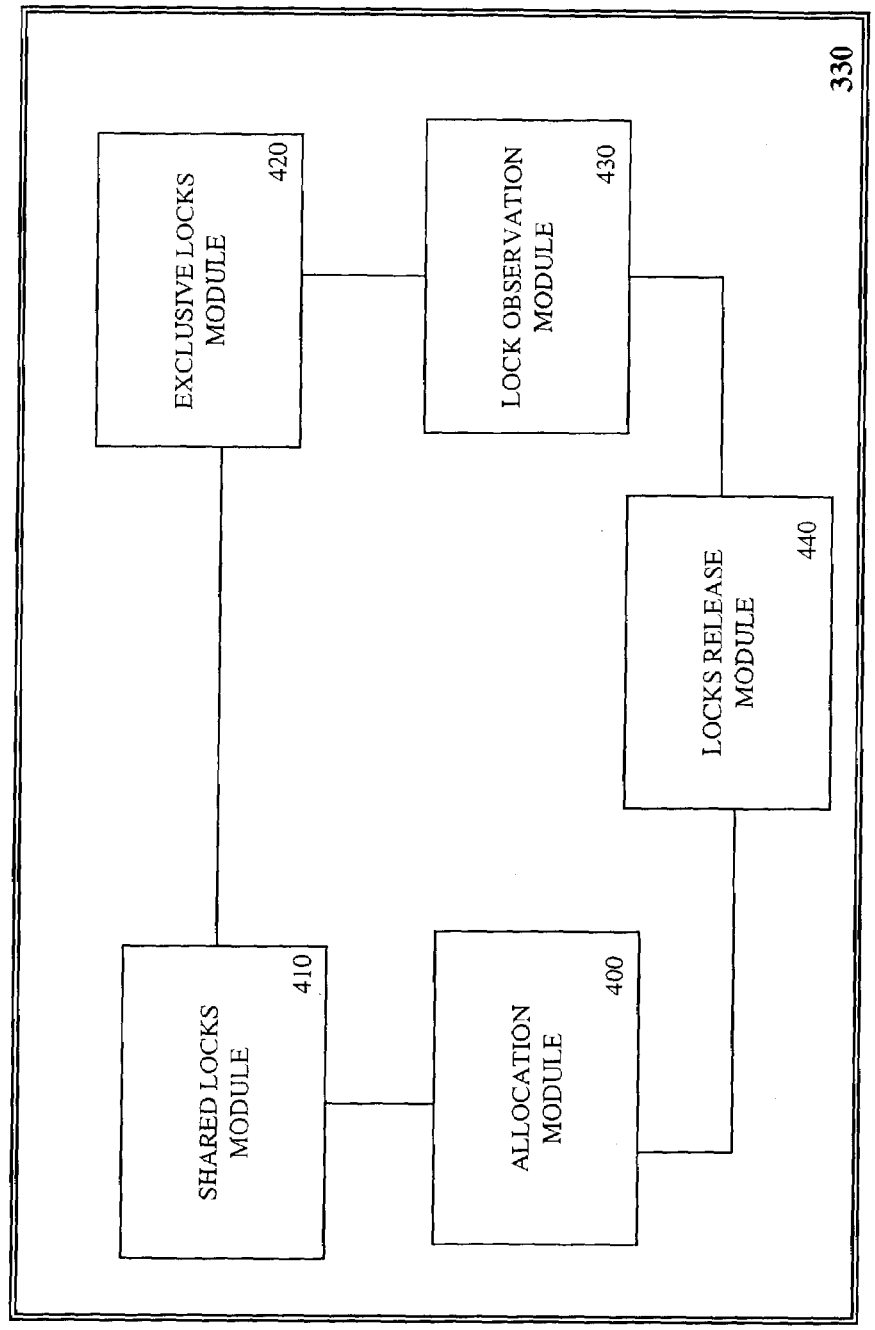
FIG. 4 is a block diagram of one embodiment of a virtual memory file-system memory descriptor generation interface of an embodiment of the present invention.

FIG. 4 is a block diagram illustration of one embodiment of an exemplary memory descriptor generation environment 400 of the present invention. The descriptor generation environment 400 as shown in FIG. 4 comprises file-system 360, file-system virtual memory descriptor generation interface (FSVMI) 370, kernel 340 and memory 330.

The file-system 360 represents a file as an unaligned, directly addressable sequence of bytes. In one embodiment of the present invention, a file is stored in a sequence of fixed sized blocks and a translation which maps (e.g., file, offset) into a dive, block-number (block#), byte offset within a block. The device may be implemented as a network of storage devices which provide secondary mapping of device block# into read-drive, real block# information. This is implemented beneath the device interface to support existing file-systems. The means of communicating with this device is primarily the buffer structure (buf structure).

The buf structure encodes many parameters, including the device identifiers, block number significant to that device, number of bytes to transfer, a set of memory specifications and a description of what to do once the I/O is complete. The buf structure is supported by a set of routines which form the buffer cache. The buffer cache provides synchronous routines to acquire buffers, and a small set of synchronous or asynchronous routes to update the corresponding storage device.

In one embodiment of the present invention, a file base storage mechanism which provides data transfer between memory descriptor and a storage object is implemented to map descriptors to corresponding memory ranges. An instance of the storage object is identified by vector of operations and a private data pointer. I/O operations are implemented asynchronous for read and write operations invoking a caller supplied notification when a descriptor generation is complete.

A file base storage mechanism provides a means for the file-system 360 to initiate data transfer using memory descriptors. This completes the requirements that the file system 360 only deal with one type of memory; the descriptor. The file base storage mechanism also separates the file-system 360 code from the device; the file-system 360 need only deal with an instance of an abstractor class of the memory descriptor.

The file-system 360 interfaces with the kernel 340 via FSVMI 370. The FSVMI 370 is used by files in the file-system 360 implementations to provide an object oriented replacement for vnodes. The interface 370 co-exists with vnode and vnode-based operating systems in the operating system of the kernel 340 while fixing the key problems of vnodes. In one embodiment of the present invention, the FSVMI 370 is provided with four sub-components comprising a primary abstraction component 410 and three sub-components 411–413 needed to support the primary abstraction component. In one embodiment of the present invention, the primary abstraction 410 component is a memory descriptor in memory 330. The memory descriptor provides a common interface to manifold memory objects in memory 330. The set of supported objects is complete to the extent that the file-system 360 does not deal with any other representation of memory.

In one embodiment of the present invention, support of the memory descriptor requires re-factoring of the existing vnode interface in the kernel 340. For example, the operations which deal with transferring pages or initially mapping do not make sense to a file-system 360 that is immune to these concepts.

In one embodiment of the present invention, one of the sub-components of the FSVMI 370 provides an implementation of vnode operations that is to be shared by all file-systems 360 in the computer system 300. In addition to maintaining the consistency of existing memory descriptors, the sub-components convert the vnode operations (VOPS) into simple uncached operations.

Furthermore, in one embodiment of the present invention, file-system 360 transfers data between memory 330 and storage devices 380 in the computer system 300 via a buffer data structure and a set of associated functions. The buf structure exposes various virtual memory data structures and requires fields to be appropriately initialized with them. To immunize the file-system 360, an abstract data transfer mechanism may be used. The abstract data transfer mechanism is based on memory descriptors using device independent naming.

Figure 5:
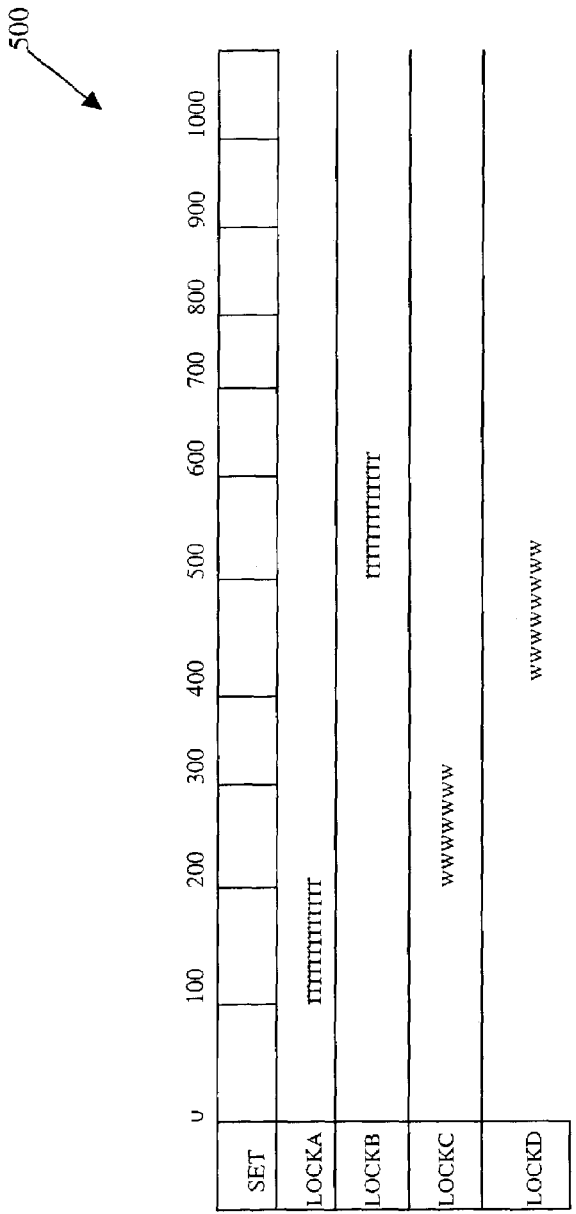
FIG. 5 is a block diagram of one embodiment of a memory descriptor generation system of one embodiment of the present invention.

Reference is now made to FIG. 5 which is a block diagram illustration of one embodiment of the memory descriptor system 370 of the present invention. The memory descriptor system 370 comprises generic descriptor generator (GDG) 500, and derive descriptor generators (DDG) 510–530.

In one embodiment of the present invention, the memory descriptor system 370 manages other memory objects and provides a common interface to operations on these objects. Each memory object has two primary components: the underlying memory itself and its mapping structure. The memory descriptor system 370 specifies a window into the object it is managing. In one embodiment of the present invention, the window is modifiable. The memory descriptor system 370 grants access to the underlying memory by providing a pointer to a sub-range of the objects. The memory descriptor system 370 has a collection of attributes which provide its behavior. These attributes are associated with a pool from which a plurality of memory descriptors may be allocated.

In one embodiment of the present invention, the memory descriptors generated by the descriptor generation system 370 are pooled. Each memory descriptor is then allocated from this pool. The pool lends lifelong attributes to the descriptors allocated from it. These attributes may also specify operational behavior of memory descriptors functions. For example, a file system may specify its preferred I/O size to a pool and the memory descriptors may attempt to operate around the size. There may not be more than one pool for a particular file-system node. However, file-system 360 nodes may share one pool.

In one embodiment of the present invention, memory descriptors support a number of logical operations which are implemented for the specific underlying objects. In one embodiment, sub-descriptors 510–530 may be derived from other descriptors. The new descriptors (derived descriptors) are identical to the original, however changes applied to the derived descriptors will not reflect on the original descriptors. Changes applied to the memory that the derived descriptor manages or the mapping are however, reflected in both the derived descriptor and the original descriptor.

In one embodiment of the present invention, the memory managed by a descriptor may be directly accessed using a memory access function which generates a pointer to a sub-range of a provided descriptor. A map operation may return a smaller extent than requested, however the first byte requested must be possible to map or else the map returns an error. An appropriate data lock may be enforced upon the range actually mapped; exclusive for write access and shared for read access. In one embodiment of the present invention, a resize function changes the window length of a descriptor and a seek function may change the base offset into a descriptor. The allowable range of values and the effect of setting these values varies by base descriptor type, etc.

The GDG 500 provides constructive functions an application requires to create a memory descriptor. In one embodiment of the present invention, the GDG 500 provides constructors for each underlying type of memory descriptor it generates. For example, a function call "fsivm-mkdesc-iovec" constructs a descriptor which manages a process address space and "uio" structure which is constructed in a write or read system call. Once the memory descriptor is constructed, it may be the subject of any of the common memory descriptor functions.

In one embodiment of the present invention, there are constructors for pages, pagelists, uios, kernel and user addresses, buffers, memory descriptors themselves, etc. The descriptor created by GDG 500 manages memory that may be accessed directly using an access function in system 370 that generates a pointer to a sub-range of a particular descriptor. The GDG 500 creates a basic descriptor that includes an allowable range of values whose settings varies by a base descriptor type.

A memory descriptor sub-component logic generates derived descriptors 510–530. The derived descriptors 510–530 are abstractions on several different types of memory representations in the computer system. The derived descriptors 510–530 are derived from the base descriptor generated by module 500. The derived descriptors 510–530 manage the base descriptor generated by module 500. The base descriptor may generate only one level of derived descriptors and any levels below the first are generated based on the base.

In one embodiment of the present invention, a duplicate function generates a derived descriptor from the original base descriptor. If the original descriptor is derived, the new derived descriptor will be derived from the original direct with a copy of the original's transformations.

Figure 6:
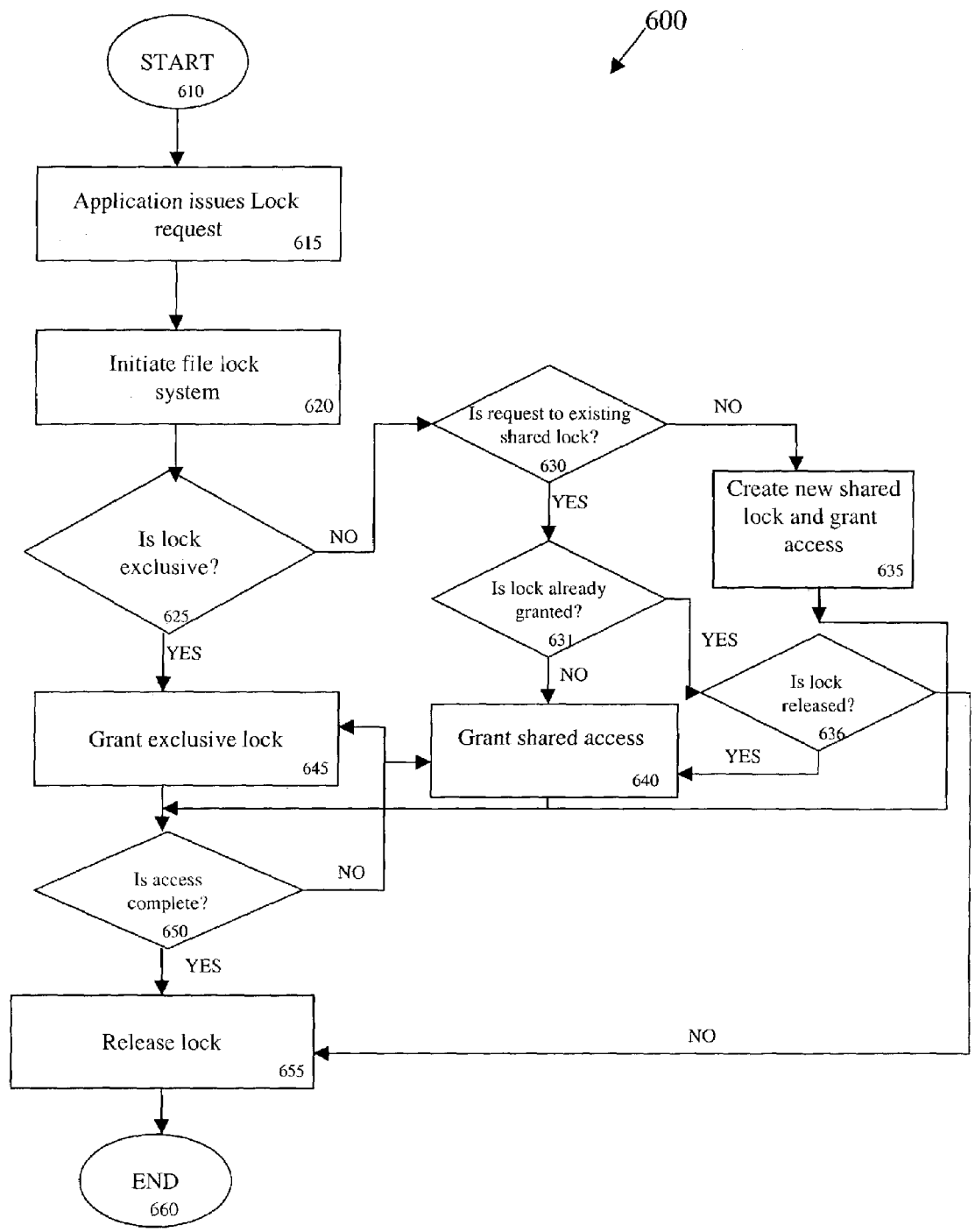
FIG. 6 is a block diagram of one embodiment an internal architecture of a derive descriptor generation logic of an embodiment of the kernel file-system interface of the present invention.

FIG. 6 is a block diagram illustration of one embodiment of the GDG 500 of the present invention. The GDG 500 comprises construct logic 610, combine logic 620, separation logic 630 and mapping logic 640.

The construct logic 610 creates a pool of base memory descriptors from which specific descriptors for specific regions in memory are allocated. The pool of descriptors is a central point for common attributes and allocation. In one embodiment of the present invention, the construct logic 600 provides a pool of attribute logic that manipulates and queries attributes of a memory descriptor pool to determine the specific attributes of a specific descriptor. The construct logic 600 constructs memory descriptors for memory functions including pages, pagelists, uios, kernel and user addresses, buffers, etc.

In one embodiment of the present invention, the construct logic 600 uses descriptor parameters that includes the control structure for related memory descriptors, the minimum number of bytes represented by a descriptor, place to store constructed virtual memory descriptors and the type of claim to make in memory to generate both base and derivative descriptors.

The construct logic 610 further creates new memory descriptors and allocates mapping information for at least a specified number of bytes for a particular descriptor. In one embodiment of the present invention, the mapping is locked by default and the actual memory may be locked by specifying claims similar to a mapping function in system 370. The construct logic 610 also may construct memory descriptor corresponding to a provided memory page by using parameters, such as the control structure for related memory descriptors, a known page, a place to store a constructed virtual memory descriptor and the type of claim to make on memory. The page will remain resident in memory and valid for the life-span of the descriptor while looking for additional locking guarantees that may be enforced by the memory claim. The descriptor that is constructed will be a direct reference to the identified page.

Combination logic 620 provides a mechanism for concatenating base and addendum information to form a larger memory descriptor. In one embodiment of the present invention, base and addendum information are identical direct types that may be extracted from the same pool and certain types may not be valid (e.g., uio base descriptors). The base descriptors may be enhanced to contain the addendum and the addendum may be transformed into a derivation of the enhanced base.

The separation logic 630 provides a mechanism for resizing descriptors created by the construct logic 610. The separation logic 630 uses parameters such as the address of a valid memory descriptor, the new size of a proposed descriptor, and an address where the new descriptor will be stored to separate an existing block of descriptors. In one embodiment of the present invention, the separation logic 630 may permit the shrinking or growth of a memory descriptor with certain restrictions. These restriction may be based on the descriptor type. In one embodiment of the present invention, derived descriptors provide results that fit with a corresponding direct descriptor.

The separation logic 630 further allows a descriptor to set adjust its base offset from the beginning of the actual memory object using parameters such as the address of a valid descriptor, the new offset of the descriptor and the address where to store the previous descriptor. This helps restrict the descriptor functions to a window of a descriptor to simplify interactions with other descriptors.

The mapping logic 640 provides a mapping for a descriptor which is valid for the sub-range defined by the offset and offset length of the actual memory of the system 370. In one embodiment of the present invention, the actual range mapped may be broader than that specified by the descriptor. An application using the descriptor may have to recover the actual range by providing a range parameter specified by system 370. The mapping logic 640 uses descriptor parameters including valid virtual memory description information, an offset from the virtual memory, description for start of a map, the number of bytes from offset to map the types of lock to maintain upon a designated area in memory.

In one embodiment of the present invention, values of zero for the length is interpreted as the remainder of the descriptor. The location to store mapping information to map descriptors information from virtual memory to physical memory.

Figure 7:
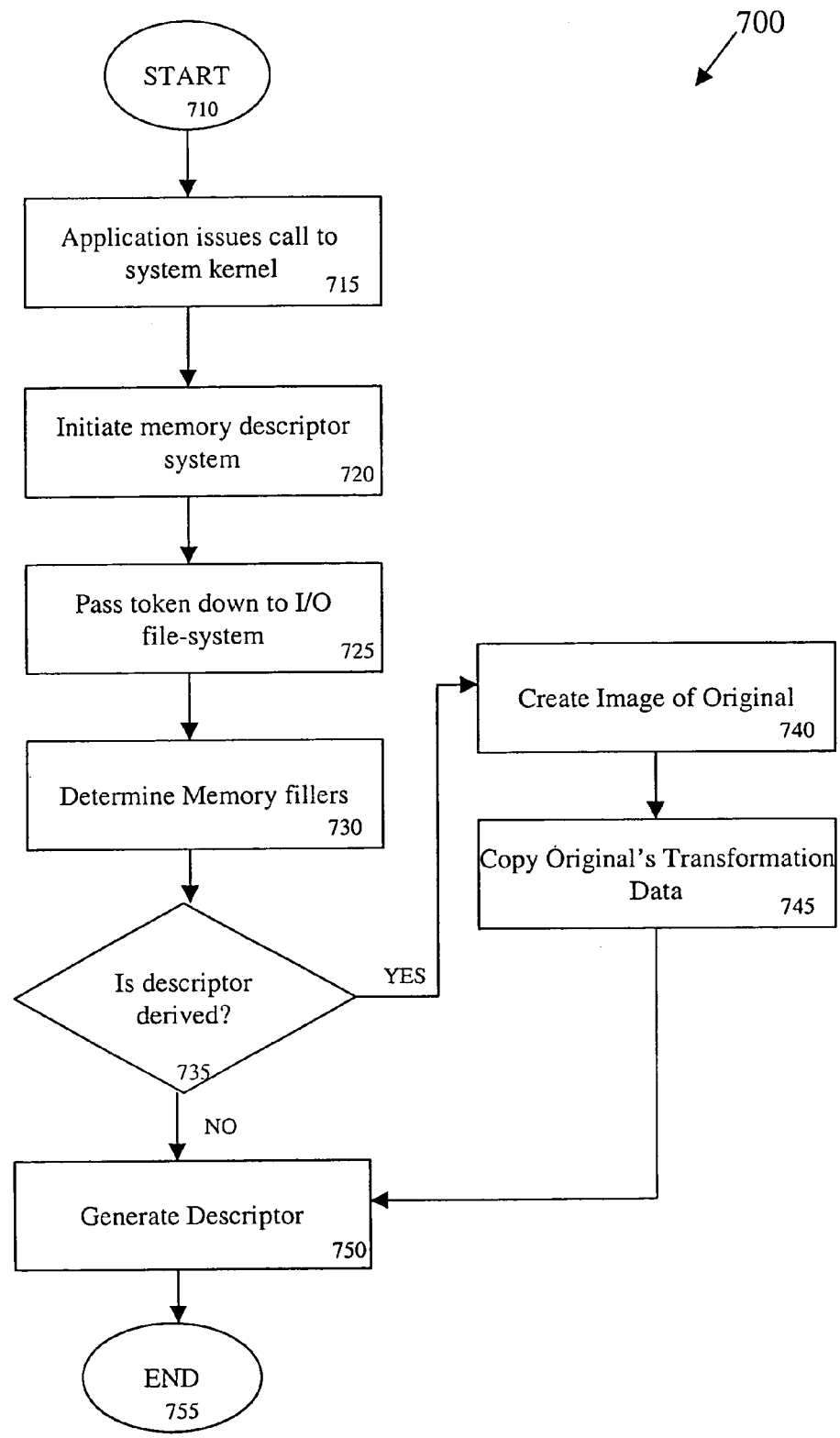
FIG. 7 is a flow diagram of one embodiment of a generating memory descriptors of one embodiment of the present invention.

Reference is now made to FIG. 7 which is an exemplary computer implemented flow diagram of one embodiment of the memory descriptor generation interface environment 700 of the present invention. As shown in FIG. 7, application programs issue sets of generic requests at step 715 by making appropriate system calls (e.g., read, write, etc.) to the kernel 340 which allows the underlying computer system memory association on the memory itself to be locked in place or captured exclusively for the generation of descriptors to the requested memory location. At step 720, the memory descriptor generation interface 370 initiates the descriptor generation logic to construct descriptors to represent the address where the application wishes to access in memory.

At step 725 a token is generated by the kernel which is then passed to the appropriate access I/O (e.g., write or read) routine with the file-system 360. The file-system 360 then fills the request from the set of memory descriptors that may be generated to handle the application's request at step 730.

At step 735, the descriptor generation interface 370 determines whether a descriptor that is being generated in response to a particular application request is derived or original. If the prescribed descriptor for a particular application is derived, the descriptor generation interface 370 creates an image of the corresponding original to the derived descriptor at step 740 and copies the associating transformation data of the original descriptor at step 745. At step 750 the appropriate descriptor is generated in response to the requested application access to memory to the appropriate memory device and processing ends at step 755.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system, comprising:
a processor;
a memory space defined by a plurality of differing memory components having differing operational characteristics;
a file system;
an operating system comprising a kernel, said kernel comprising a plurality of static data structures each comprising entries, each entry comprising fields; and
a file system virtual memory interface system having a memory descriptor corresponding to one of said plurality of data structures that is distributed among a subset of the memory components of said plurality of differing memory components, said file system having three sub-components, said three sub-components to facilitate functional operations on said one of said plurality of data structure that are supported by said operational characteristics of the memory components of said subset.

2. The computer system of claim 1, wherein said three sub-components comprise a file base storage, span locks and vnode emulation logic.

3. The computer system of claim 2, wherein said file base storage provides a mechanism for extending said memory descriptor to said file system.

4. The computer system of claim 3, wherein said span locks synchronize access to files in said file system.

5. The computer system of claim 4, wherein said vnodeemulation logic assists in integration of vnode operations in said operating system.

6. The computer system of claim 1, wherein said file system virtual memory interface system generates a first plurality and a second plurality of memory descriptor types for providing a single mechanism of representing memory objects in said memory.

7. The computer system of claim 6, wherein said first plurality of memory descriptor types manage said memory objects.

8. The computer system of claim 7, wherein said second plurality of memory descriptor types manage other descriptors generated by said file system virtual memory interface system.

9. The computer system of claim 8, wherein said file system virtual memory interface system comprises base generic memory descriptor generation module for generating a plurality of base memory descriptors of said memory descriptor.

10. The computer system of claim 9, wherein said file system virtual memory interface system further comprises derived memory descriptor generation module for generating a plurality of derived descriptors of said memory descriptor, each of said plurality of derived descriptors depending on corresponding ones of said plurality of base memory descriptors.

11. The computer system of claim 10, wherein said base generic memory descriptor generation module comprises construct sub-module for creating a pool of said base memory descriptors from which specific memory descriptors for specific regions of said memory are allocated.

12. The computer system of claim 11, wherein said base generic memory descriptor generation module further comprises combine sub-module for concatenating base and addendum information from a plurality of said base memory descriptors to form a corresponding larger base descriptor.

13. The computer system of claim 12, wherein said base generic memory descriptor generation module further comprises separation sub-module for enabling said large base descriptor to adjust its base offset from a beginning of an actual memory object.

14. The computer system of claim 13, wherein said base generic memory descriptor generation module further comprises mapping sub-module for mapping valid descriptors for a sub-range of said memory and defined by an offset and an offset length in said memory.

15. The computer system of claim 10, wherein said plurality of derived descriptors are substantially identical said corresponding base descriptors.

16. A computer system having memory, a file system and an operating system, said operating system comprising:
   a kernel comprising a plurality of static data structure types;
   a file system memory interface system comprising a memory descriptor and three sub-components, said three sub-components supporting said memory descriptor in said file system, with said file system memory interface system further comprises base generic memory descriptor generation module for generating a plurality of base memory descriptors of said memory descriptor and a derived memory descriptor generation module for generating a plurality of derived descriptors of said memory descriptor, each of said plurality of derived descriptors depending on corresponding ones of said plurality of base memory descriptors.

17. The operating system of claim 16, wherein said three sub-components comprise a file base storage, span locks and vnode emulation logic.

18. The operating system of claim 17, wherein said file base storage provides a mechanism for extending said memory descriptor to said file system.

19. The operating system of claim 18, wherein said span locks synchronize access to files in said file system.

20. The operating system of claim 19, wherein said vnode emulation logic assists in integration of vnode operations in said operating system.

21. The operating system of claim 20, wherein said file system memory interface system generates a first plurality and a second plurality of memory descriptor types for providing a single mechanism of representing memory objects in said memory.

22. The operating system of claim 21, wherein said first plurality of memory descriptor types manage said memory objects.

23. The operating system of claim 22, wherein said second plurality of memory descriptor types manage other descriptors generated by said file system virtual memory interface system.

24. The operating system of claim 16, wherein said base generic memory descriptor generation module comprises construct sub-module for creating a pool of said base memory descriptors from which specific memory descriptors for specific regions of said memory are allocated.

25. The operating system of claim 24, wherein said base generic memory descriptor generation module further comprises combine sub-module for concatenating base and addendum information from a plurality of said base memory descriptors to form a corresponding larger base descriptor.

26. The operating system of claim 25, wherein said base generic memory descriptor generation module further comprises separation sub-module for enabling said large base descriptor to adjust its base offset from a beginning of an actual memory object.

27. The operating system of claim 26, wherein said base generic memory descriptor generation module further comprises mapping sub-module for mapping valid descriptors for a sub-range of said memory and defined by an offset and an offset length in said memory.

28. A computer-implemented file system memory descriptor generation interface method, said method comprising:
   providing access to a computer system file system;
   issuing system calls to a kernel to access files in said file system;
   providing a file system interface memory generation system to generate a plurality of memory descriptors linking said system calls to said file system to memory locations distributed among a plurality of differing memory components, in said computer system, with a subset of said plurality of memory components having differing operational characteristics, with one of said plurality of memory descriptors corresponding to memory address distributed among said subset containing data associated with one of said files, with said file system interface developing a sub-components to facilitate functional operations on said data that are supported by said operational characteristics of the memory components of each of the memory components of said subset.

29. A method of claim 28, wherein said file system memory interface system further generates a first plurality and a second plurality of memory descriptor types for providing a single mechanism of representing memory objects in said memory.

30. A method of claim 29, wherein said first plurality of memory descriptor types manage said memory objects.

31. A method of claim 30, wherein said second plurality of memory descriptor types manage other descriptors generated by said file system virtual memory interface system.

32. A method of claim 31, wherein said file system memory interface system further comprises base generic memory descriptor generation module for generating a plurality of base memory descriptors of said memory descriptor.

33. A method of claim 32, wherein said file system memory interface system further comprises derived memory descriptor generation module for generating a plurality of derived descriptors of said memory descriptor, each of said plurality of derived descriptors depending on corresponding ones of said plurality of base memory descriptors.

34. A method of claim 33, wherein said base generic memory descriptor generation module comprises-construct sub-module for creating a pool of said base memory descriptors from which specific memory descriptors for specific regions of said memory are allocated.

35. A method of claim 34, wherein said base generic memory descriptor generation module further comprises combine sub-module for concatenating base and addendum information from a plurality of said base memory descriptors to form a corresponding larger base descriptor.

36. A method of claim 35, wherein said base generic memory descriptor generation module further comprises separation sub-module for enabling said large base descriptor to adjust its base offset from a beginning of an actual memory object.

37. A method of claim 36, wherein said base generic memory descriptor generation module further comprises mapping sub-module for mapping valid descriptors for a sub-range of said memory and defined by an offset and an offset length in said memory.

* * * * *